Aug. 16, 1966 R. J. SCOTT 3,267,396

HIGH POWER FILTER

Filed Feb. 28, 1963 2 Sheets-Sheet 1

INVENTOR
Robert J. Scott
BY Bosworth Sessions Herrstrom & Knowles
ATTORNEYS

Aug. 16, 1966 R. J. SCOTT 3,267,396

HIGH POWER FILTER

Filed Feb. 28, 1963 2 Sheets-Sheet 2

INVENTOR
Robert J. Scott
BY Bosworth, Sessions, Herrstrom & Knowles
ATTORNEYS

United States Patent Office 3,267,396

Patented August 16, 1966

3,267,396
HIGH POWER FILTER

Robert James Scott, Parma, Ohio, assignor to Bird Electronic Corporation, Solon, Ohio, a corporation of Ohio Filed Feb. 28, 1963, Ser. No. 261,723
8 Claims. (Cl. 333—70)

This invention relates to electric wave filters and particularly to compact high power high frequency wave filters.

At frequencies ranging upward from about 50 megacycles per second, it becomes increasingly difficult to use electric wave filters consisting of lumped constant circuit elements, particularly in resonant circuits where a high "Q" is required. At such high frequencies conventional inductance and capacitance elements usually fail to behave as they do in lower frequencies. Often significant mutual impedances develop between filter branches and undesired high magnitude reactances arise between parts of the filter and the leads connecting the parts of the filter, causing leakages or cross talk that can impair the ability of the filter to reject or attenuate undesired signals.

Relatively low power electric wave filters for frequencies of this order, employing coaxial lines, capacitors, and coils as circuit elements, have been successfully used. It has been possible to make such filters small and light enough to permit them to be employed in complex apparatus where space and weight are at a premium.

However, as far as is known, it has not been possible to provide wave filters operating at frequencies of at least about 50 megacycles per second and high powers on the order of 500 watts or more, which are small and light and employ coaxial lines, capacitors, and coils. Rather, it has been necessary to make such high frequency high power filters in the form of relatively heavy tubular structures several feet long.

This has arisen because when it has been attempted to make small high power high frequency filters the tendencies toward development of leakages and cross talk have been greatly increased, as have been tendencies toward break-down of dielectrics, arcing and undesirable intereffects among the components of the filter when they are closely positioned in a compact filter. Yet it is important that such filters, in addition to small size and light weight, have low pass band insertion losses, low voltage standing wave ratios, and high stop or reject band attenuation, and a minimum of coupling, leakage, cross talk, or other reactions between the components of the filter. Moreover, the parts and filter units embodying the parts must be accurately and precisely manufactured and assembled in close precise relationship at moderate costs.

It is the object of this invention to provide compact high power high frequency filters which satisfy the above requirements.

It is a further object of this invention to provide such a filter which is externally shielded and also internally shielded into a plurality of compartments in which the filter components are so located relative to each other and to such compartments that undesired coupling, leakages, cross talk or other similar effects are substantially or completely eliminated.

As an additional object and further refinement, the invention provides a high frequency high power filter comprising a housing formed of conductive material in which are longitudinally disposed two sets of coaxial line elements, the input ends of the elements of one set being directed toward and connected to an input element or terminal fitting of the filter at one end of the housing while the input ends of the other coaxial line elements are directed toward and connected to an output element or terminal fitting at the other end of the housing, the housing being subdivided by spaced partition means supporting the capacitors.

Another object of the invention is the provision of a capacitor suitable for incorporation in such a filter, comprising plate members nested in dielectric members which are disposed on opposite sides of a partition in parallel relation thereto, the dielectric members interfitting and being centrally connected to locate and support the plate members in the capacitor and to locate and support the capacitor on the partition.

A further object is the provision of a filter structure like that described above in which the conductor members may be of large diameters, such as tubes, and which are mechanically clamped to the coaxial lines, capacitors and other elements to which they are connected to provide good electrical contact and reduce the necessity of reliance on solder for support and maintenance of electrical contact.

Other objects and advantages relate to certain novel features of construction and combinations of parts apparent in the following detailed description of a preferred embodiment and modification thereof representing the best known mode of practicing the invention. This description is made with reference to the accompanying drawings forming a part of the specification.

Figure 1:
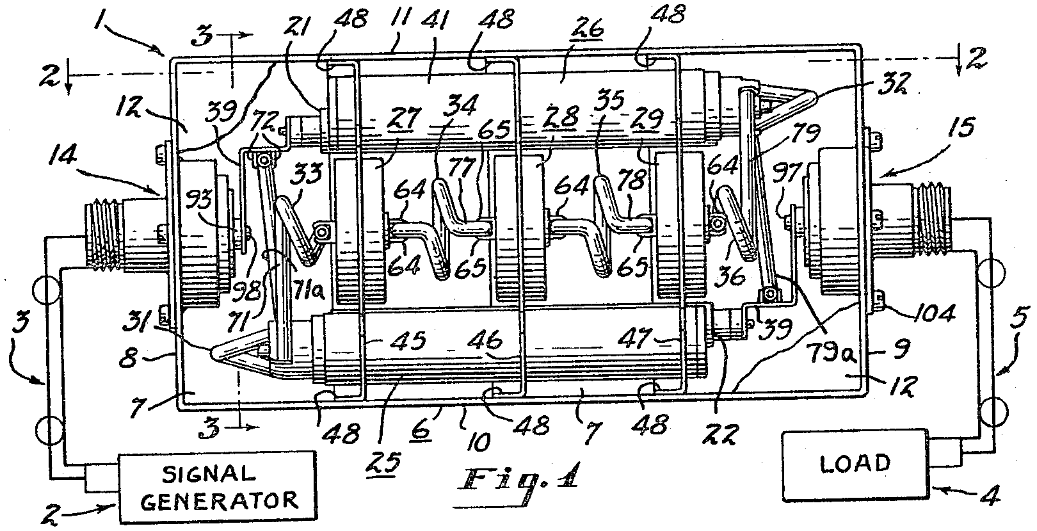
FIGURE 1 is a partly diagrammatic plan of a coaxial line circuit which includes a low pass high power filter embodying the invention, the lid being partially broken away to show the interior of the housing.

In FIGURE 1, the filter 1 is connected at its input end to a diagrammatically indicated signal generator 2 by a coaxial transmission line 3, and to a diagrammatically indicated load 4 by a coaxial transmission line 5.

Figure 2:
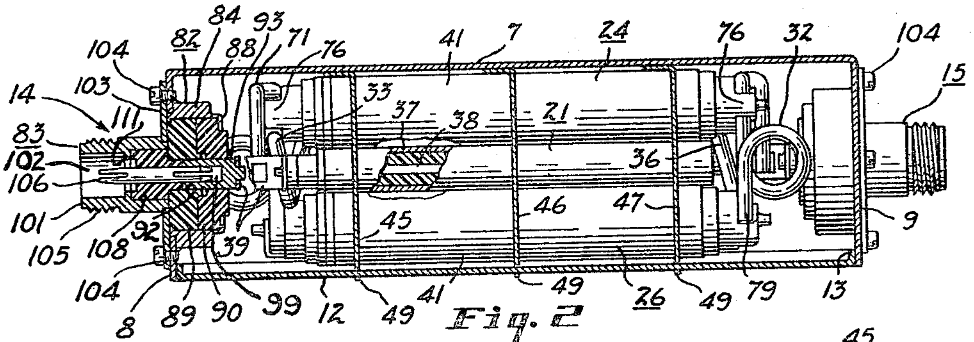
FIGURE 2 is a side sectional elevation, from line 2—2 of FIGURE 1, to the same scale.
Figure 3:
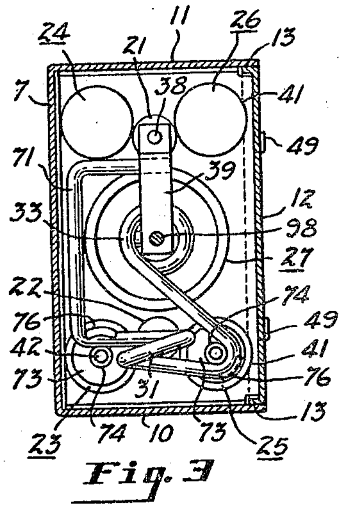
FIGURE 3 is a sectional elevation along line 3—3 of FIGURE 1 and to the same scale.

As shown in FIGURES 1, 2 and 3, filter 1 comprises an elongated open-top rectangular box-like housing 6 formed of suitable electrically conductive material such as sheet brass having a bottom wall 7, end walls 8 and 9, and side walls 10 and 11. A lid 12, having flanged edges 13, is adapted to be inserted into the open top of housing 6 to close it.

An input terminal fitting 14 is mounted in end wall 8, and an output terminal fitting 15 is mounted in end wall 9, the axes of these terminal fittings in this embodiment lying along an axis extending lengthwise of the housing 6 substantially midway between its side walls and between its bottom wall and the lid 12.

The filter unit shown is designed to provide a pass-band of from about 200 to about 400 megacycles per second at a power of from about 1000 to about 2500 watts, with sharp cut-off and maximum attenuation above cut-off. This illustrative filter is small, housing 6 being only six inches long, three inches wide, and less than two inches deep, the filter weighing only about two pounds.

Figure 11:
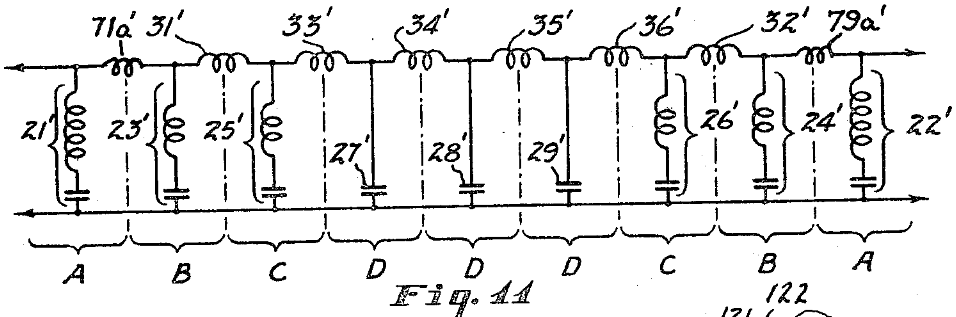
FIGURE 11 is an equivalent lumped constant circuit diagram of the illustrated filter.

The equivalent lumped constant circuit is shown in FIGURE 11, with broken lines indicating the sections of the circuit. It comprises two half sections, each indicated by A, primarily for terminating purposes; four full *m*-derived sections, two indicated by B and two by C, for sharp cut-off; and three "constant K" sections, each indicated by D, for maximum attenuation above cut-off.

Figure 12:
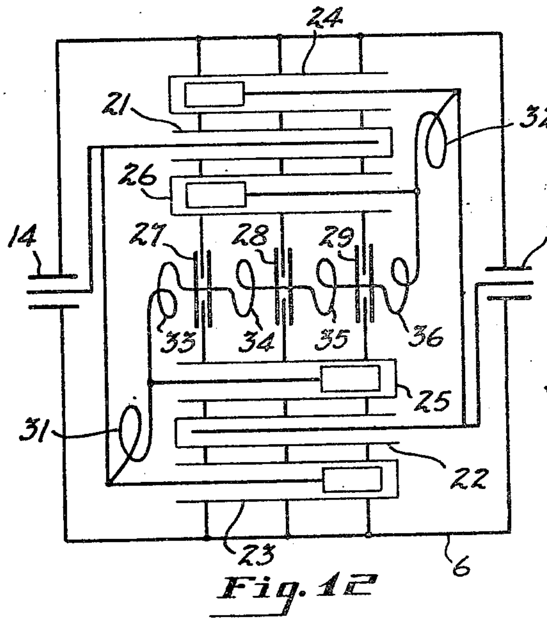
FIGURE 12 is a diagrammatic view, with the filter elements in exploded relation, showing the electrical connections of the components.

The actual elements or components employed in the filter shown for clarity somewhat diagrammatically in FIGURE 12, and as actually constructed for use in FIGURES 1, 2 and 3, comprise two end termination, series resonant, shunt coaxial line elements 21 and 22 corresponding generally to elements 21' and 22' of the half sections A of the lumped constant circuit of FIGURE 11; two higher capacity series resonant shunt coaxial line elements 23 and 24 corresponding generally to elements 23' and 24' of full sections B of the circuit of FIGURE 11; two similar higher capacity series resonant, shunt coaxial line elements 25 and 26 corresponding generally to elements 25' and 26' of full sections C of FIGURE 11; three capacitors 27, 28 and 29 corresponding generally to capacitors 27', 28' and 29' of the "constant K" sections D of FIGURE 11; two end coils 31 and 32, 31 between line elements 23 and 25 and 32 between line elements 24 and 26 and corresponding generally to the inductors or coils 31' and 32' of FIGURE 11; and four intermediate series coils 33, 34, 35 and 36 located between line elements 25 and 26 in alternating relation to capacitors 27, 28 and 29, and corresponding to inductors or coils 33', 34' 35' and 36' of the lumped constant circuit of FIGURE 11.

The series resonant, shunt coaxial line elements 21 and 22 are approximately one-eighth wave length open stub coaxial transmission lines each being the shunt leg of one-half of a $\pi$ section of the filter, and constituting a termination section. Each is designed for resonance at twice the frequency of the resonant frequency of the coaxial line elements 23, 24, 25 and 26, being designed for resonance at about 1,000 megacycles in the present example; each also is designed so that the physical length as well as the electrical length of the coaxial line element is reduced and the voltage breakdown increased, all with a small loss in "Q." Each line element 21 and 22 comprises an elongated cylindrical closed-end electrically conductive outer tube 37, preferably of brass, constituting the outer conductor, and a central conductor 38 also preferably of brass firmly coaxially secured in place inside of tube 37 by a solid dielectric sleeve of suitable length and formed of suitable material such as polytetrafluoroethylene that permits substantial reduction of both the electrical and physical length of the line, increases voltage breakdown, and results in small "Q" loss. The central conductor 38 of each of these coaxial line elements has soldered to it a connector 39 of a design and for a purpose to be described later.

The coaxial line elements 23, 24, 25 and 26 are all identical, each being a series resonant open stub quarter wave length coaxial transmission line, the electrical length of which is dependent upon the resonant frequency for the desired *m* in the filter. In the device shown the coaxial line elements 23, 24, 25 and 26 constitute the shunt legs of the filter T's and to obtain cut-off at a frequency of approximately 400 megacycles per second they are designed for resonance at a frequency of about 500 megacycles per second. Each of these elements may be made in a known manner to have a major portion with a conductor of small cross section and an air dielectric providing a high $Z_0$ for inductance, and a minor portion with a solid dielectric and an enlarged conductor to provide a relatively low $Z_0$ for capacitance, the two portions being in series and proportioned to provide the desired series resonance above cut-off frequency as well as high resistance to arcing. Thus are obtained the desired inductive and capacitive characteristics in a relatively short physical length to permit complete enclosure in a short compact housing.

In the illustrative embodiment, each of the elements 23, 24, 25 and 26 is only about half the physical length of conventional open stub lines having equivalent electrical properties for filter purposes. Each comprises an elongated electrically conductive outer brass tube 41 having one closed end, in which tube a central conductor 42 is rigidly coaxially supported and located by one or more solid dielectric bushings 43 made of suitable material such as polytetrafluoroethylene.

As shown in FIGURES 1 and 2, the coaxial line elements are arranged with their outer tubes in parallel overlapping relation, the tubes being arranged in two groups. In one group the tube 37 of end termination coaxial line element 21 is located between tubes 41 of coaxial line elements 24 and 26 and the input end of element 21 extends oppositely away from the input ends of elements 24 and 26; in the other group the tube 37 of end termination coaxial line element 22 is located between the tubes 41 of the coaxial line elements 23 and 25 and its input end extends oppositely away from the input ends of elements 23 and 25; in each group the adjacent tubes in each group are in contact and soldered in fixed relation to each other. The groups as a whole are arranged so that the input ends of the end termination elements 21 and 22 extend oppositely away from each other and the input ends of elements 24 and 26 extend oppositely away from the input ends of element 23 and 25. Thus the one-eighth wave end terminaiton line element of each group and the two quarter wave line elements of the other group form one set with their input ends extending in the same direction and connected together. The two groups of tubular coaxial line elements also extend generally parallel to each other and to the side walls of the housing which they closely approach, the groups defining in effect two walls of tubular members which are upright with respect to the bottom of the housing and which define between them a space of substantial width in which the capacitors 27, 28 and 29 and their associated conductors are located.

The tubular members of the coaxial line elements are so located and secured in three partitions 45, 46 and 47 extending transversely of the housing and secured to its side walls by flanges 48 on the side edges of the partitions soldered to the inner surfaces of the side walls. Partitions 45 and 47 are located near the ends of the tubular members while the intermediate partition 46 is located centrally of the housing and of the outer partitions. The partitions have openings through which the outer tubes of the coaxial line elements extend and make electrically conductive contact with the partitions, to which the tubes are soldered. At their top edges, the partitions have spaced lugs 49 adapted to project through corresponding openings in the lid 12 to aid in locating and securing it.

The partitions thus divide the space inside the housing 6 into four compartments and electrically shield and isolate filter components or portions thereof located in each of the compartments from components or parts located in others of the compartments. Each of the partitions has an opening 51 (FIGURE 4) locating the associated capacitor and making possible an electrically conductive path which extends through but is insulated from the partition.

Figure 4:
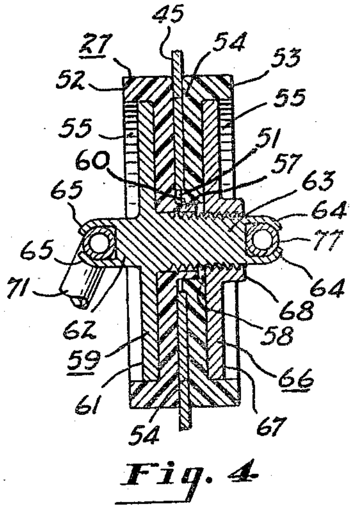
FIGURE 4 is a diametric sectional elevation to an enlarged scale of one of the capacitors embodied in the filter of FIGURES 1 to 3.

As shown in FIGURE 4, each capacitor comprises two circular dielectric members 52 and 53 each having in one side a flat surface 54 adapted to bear against one side of a partition and at its other side a flat-bottomed recess 55. One of the dielectric members 52 has a central opening 56 and a circular flange surrounding the opening and projecting from the flat surface 54 of member 52; the flange 57 projects through opening 51 in the partition and into an opening 58, in which it closely fits, in the other dielectric member 53. Dielectric members 52 and 53 are made of suitable dielectric material such as polytetrafluoroethylene, which has desirable dielectric properties and also has sufficient strength and toughness to permit the dielectric members to act as structural members.

Dielectric member 52 also supports a metal plate member 59 that has a circular disk portion 61 nested in recess 55 of member 52, a hub-like outer central projection 62, and an externally threaded central stem 63 projecting through the opening 58 in dielectric member 53. The unsupported end of stem 63 is slotted to provide two clamping fingers 64 for a purpose to be described later; similarly the unsupported end of the projection 62 is slotted to provide clamping fingers 65.

The capacitor also includes another plate member 66 having a disk portion 67 nested in recess 55 of dielectric member 53, and a central hub 68 internally threaded to enable it to be screwed on stem 63 sufficiently tightly to clamp the plate members 59 and 66 and dielectric members 52 and 53 onto the associated partition member 53. The recesses 55 are sufficiently deep to prevent edge arcover. The plate members 59 and 66 are located radially relatively to their dielectric members 52 and 53, the dielectric members are located radially relatively to each other, and whole assemblage is located transversely and clamped on the associated partition 45, 46 or 47. Flange 57 of dielectric member 52 and flange 60 or dielectric member 53 serve to insulate the stem portion of plate member 59 from the partition; flange 60 also locates the capacitor in the partition opening. The partition thus constitutes one plate of the capacitor, the other plate of which is formed by electrically connected plate members 59 and 66 are preferably brass.

The conductors which connect the input ends of the coaxial line elements and which connect the capacitors to each other and to the line elements and to the terminals of the filter are preformed to include the various coils and to fit between the elements which they connect. In the illustrated embodiment, the conductors are relatively large in diameter to prevent overheating at the power levels involved, preferably being formed of brass or copper tubing one-eighth inch in dameter that is silver clad, as by being silver plated, to reduce skin effects and $I^2R$ losses. Beginning at the left end of FIGURE 1 and as also shown in FIGURE 3, there is a conductor 71 one end of which is connected to the connector 39 and the other end of which is clamped between the fingers 65 of the capacitor 27, which fingers are bent to hold the conductor end firmly in place and in electrical contact with the capacitor plate member 55. The conductor 71 is connected to the input ends of coaxial line elements 23 and 25, and also embodies the coils 31 and 33. This connector 39, shown in FIGURES 1, 2 and 3, which is soldered to the center conductor of the end termination coaxial line element 21 and to the center conductor of input terminal fitting 14, is formed of a strip of brass that is relatively wide transversely to the direction of current flow in relation to its thickness, its width being preferably at least ten times its thickness, to provide adequate areas for current transmission and to radiate heat and prevent overheating at the high power levels involved; it is also silver plated to reduce undesired skin effects. This strip is formed with two clamping lugs 72 between which the end of conductor 71 is mechanically clamped in electrical contact.

Figure 5:
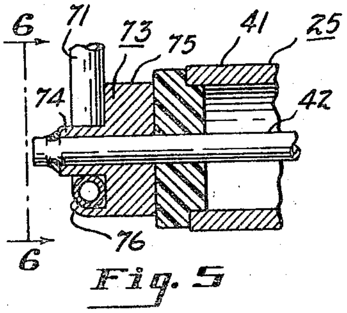
FIGURE 5 is a detail sectional elevation to an enlarged scale showing one of the clamp connections of a conductor to the input end of one of the coaxial line elements.
Figure 6:
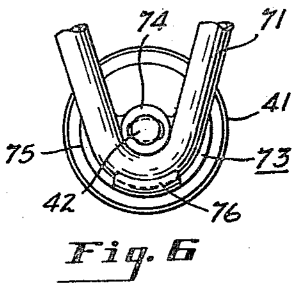
FIGURE 6 is a front elevation from line 6—6 of FIGURE 5 and to the same scale.

At the input end of each of the higher capacity coaxial line elements 23, 24, 25 and 26, the center conductor 42, as shown in FIGURES 5 and 6, illustrating the input end of element 25, has fixed thereon a connector member 73. This member at its front has an axially projecting circular boss 74 of sufficient length to support the large diameter conductor 71 and at its rear has a radially extending enlarged flange portion 75 of a diameter that may approximate the diameter of the outer tube of the line element. An axially forwardly projecting lug 76 extends along a substantial portion of the circumference of the flange portion, the inner surface of the lug being spaced from the outer surface of boss 74 by a distance approximating the diameter of conductor 71. Consequently, the conductor 71 can be firmly mechanically clamped in electrical contact with the center conductor connector 73 by bending the lug 76 as shown in FIGURES 5 and 6.

As shown in FIGURE 3, the conductor 71 is preformed to have a straight portion that extends tangentially of the central boss 74 on the central conductor connector 73 of coaxial line element 23 and is firmly clamped in place against the boss by lug 76. As is also shown in FIGURE 3, and to an enlarged scale in FIGURES 5 and 6, the conductor 71 also is preformed into a curve extending almost 180° around the central boss 74 of the connector 73 on the coaxial line element 25, and is firmly mechanically clamped in place and in electrical contact by the bent lug 76.

The filter includes another conductor 77, preformed to provide coil 34, that is mechanically firmly clamped at one end by bent fingers 64 on the stem 63 of plate member 59 of capacitor 27, and at the other end is similarly mechanically firmly clamped by the fingers 65 on the end of projection 62 of plate member 61 of capacitor 28.

Conductor 78 is identical with conductor 77, being shaped to provide coil 35 of the circuit. Its ends are mechanically firmly clamped by the fingers 64 on the ends of the stem 63 of the plate members 66 of the capacitor 28, and by fingers 65 on the end of stem 62 of capacitor 29.

The circuit is completed by conductor 79, which is identical to conductor 71. The two coils of this preformed conductor provide the coils 32 and 36 of the filter circuit. Its ends are mechanically clamped to the plate member 66 of capacitor 29, and to the strip connector 39 soldered to the central connector of coaxial line element 22 and the center connector of the output terminal 15. The conductor 79 is also mechanically clamped to the connectors 73 on the center conductors of the coaxial line elements 24 and 26, as described above in connection with the clamping of conductor 71 to the connectors 73 on the coaxial line elements 23 and 25.

In the filter of FIGURES 1 to 3 inclusive the input and output terminal fittings 14 and 15 are both constructed as shown in section at the left end of FIGURE 2, although fittings of different types may be used. Each fitting 14 and 15 includes a female portion generally indicated by 82 and a demountable male portion generally indicated by 83. The female portion includes a short sleeve 84 soldered to the end wall of the housing 6, the sleeve being accurately located by circular external rabbet at the outer end of the sleeve that is closely received in an opening in the housing. The sleeve has a large central opening the inner end of which is partially closed by a radially inwardly extending circumferential flange that acts as a stop; the inner end of the sleeve also has a flange 88 which is initially formed to extend axially but which in assembly is bent radially inward to lock the solid insulator members 89 and 90 in place in the sleeve opening.

The cooperating dielectric members 89 and 90 define a central opening 92 adapted to fit tightly the outer surface of the socketed center conductor member 93. The outermost insulator member 89 has an outer circumferential rabbet that engages an internal flange in sleeve 84. At its inner end insulator member 89 has around central opening 92 an axially extending flange which is received in a rabbet in insulator member 90, the flange and rabbet bearing on opposite sides of a radially extending external flange on center conductor member 93 to secure and locate it axially in the insulator members. The center conductor member 93, preferably formed of brass, projects slightly at the inner end of the fitting, and has thereon a boss to facilitate soldering to the connector 39; member 93 also has a cylindrical bore or socket 99 that extends inwardly from its other end.

The insulator members 89 and 90 are formed of a solid material having suitable dielectric properties, such as polytetrafluoroethylene, and all surfaces thereof which contact sleeve 84, center conductor member 93, and the other insulator member are preferably coated with a suitable adhesive before assembly so the female member 82 in effect forms a sealed, solid and unitary structure.

The male member 83 is similar to that disclosed in FIGURE 3 of Bird et al. Patent 2,966,645 of December 27, 1960. It comprises a tubular metal element 101, conveniently made of brass, having therethrough a central opening 102, and a circular external rabbet received within an opening of an attaching flange plate 103 also of brass, these two parts being rigidly joined together by brazing or soldering although they may be formed as an integral unit. This attaching plate is fixed to the outer surface of the appropriate end wall of the filter housing 61 as by screws 104 to establish a strong physical and good electric connection. An external thread 105 on the outer end of element 101 is adapted to receive the conventional coupling collar (not shown) on the end of the coaxial transmission line to which the filter unit is to be connected.

Male member 83 also includes a terminal pin 106 one end of which is tapered and slotted and located in opening 102 within the threaded portion of tubular member 101, and the other end of which projects from member 83 and is also tapered and slotted and adapted to be received with a press fit in the bore 99 of the center conductor 93 of the female portion of the terminal fitting. The pin 106 is firmly held in a tubular insulator 108 of tough solid dielectric material such as polytetrafluoroethylene received in the central opening 102 in element 101, against one side of internal flange 111, by a press fit. Opening 102 in element 101 is formed by counterbores that define the annular internal flange 111 centrally of the tubular element 101. The insulator 108 is longer than the counterbore containing it, its projecting end portion being of reduced diameter so it can be received within the portion of the opening 92 in insulator member 89 that is not occupied by the center conductor member 93.

The reduced diameter end portion of insulator 108 provides in the plane of the end face of the male member 83 a radial shoulder that abuts the end face of the insulator 89 of the female member 82. The end of the central conductor member 93 of the female member is spaced axially from such shoulder and end face. Such axial offsets improve the transition since the step-down to the diameter of the pin 106 is axially spaced from the plane of the step-down in the outer conductors. This design not only facilitates manufacture, but also makes possible the ready replacement of the male member 83 of the terminal fitting by another having unworn or different size tubular element 101 or pin 106.

Figure 7:
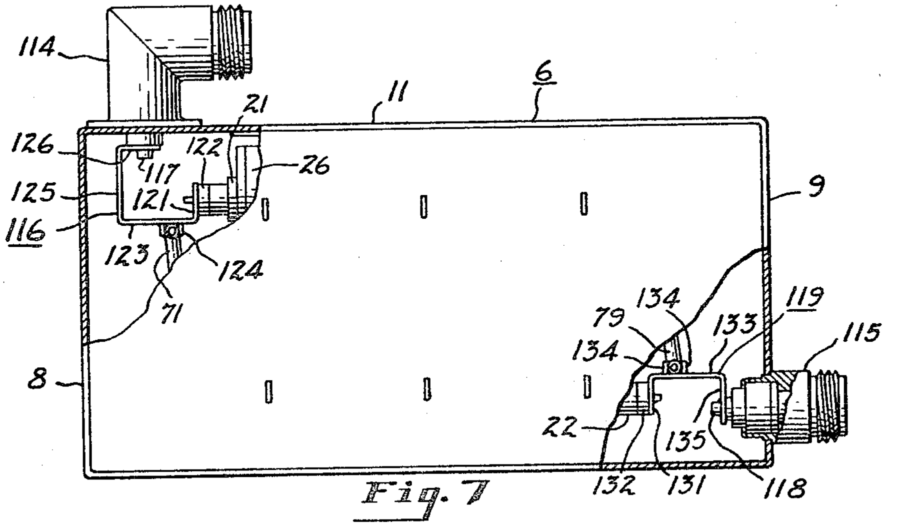
FIGURE 7 is a modification of the filter of FIGURES 1 to 3 showing a different input and output fitting.

Filters embodying the invention may also be formed with different types of coaxial terminal fittings, located in different positions, as shown in FIGURE 7. In this figure the input terminal fitting 114 is shown as a conventional angle type and the output terminal fitting 115 is a conventional axial type, both being permanently fixed as by soldering to the filter housing 6. Fitting 114 is located in one of the side walls of the housing and is connected to the end termination coaxial line element 21 by a connector 116 (FIGURE 8) which is soldered to the center conductor of such coaxial line element and to the center conductor 117 of fitting 116. The output terminal member 115 is fixed in an offcenter location to the end wall 9 of housing 6 and its center conductor 118 is connected by connector 119 (FIGURE 9) to the center connector end termination coaxial line element 22 of the filter.

Figures 8, 9, 10:
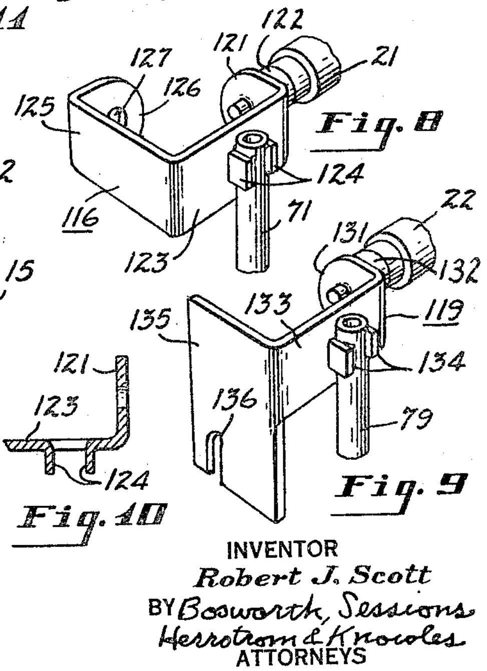
FIGURE 8 is a perspective showing one of the terminal connectors in FIGURE 7.
FIGURE 9 is a perspective showing another of the terminal connectors in FIGURE 7.
FIGURE 10 is a detail of a portion of the connector of FIGURE 8.

As shown in FIGURES 8 and 10, the input connector 116 is formed of a relatively wide, thin, strip of sheet metal having a leg 121 fixed to cylindrical socket 122 adapted to fit over and be soldered to the center connector of the coaxial line element 21; an intermediate portion 123 at right angles to leg 121, such portion being formed with two projecting lugs 124 adapted to clamp around and mechanically hold the end of conductor 71 of the filter; and another intermediate portion 125 at right angles to the first which carries a connecting portion 126 adapted to be secured as by opening 127 and by soldering to the center conductor 117 of the input terminal 114. The connector 116 is of sufficient width to provide adequate area for current transmission and is of sufficient length and width to provide adequate heat radiating capacity to maintain a relatively low temperature of the connector and the adjacent portions of the parts to which it is connected.

Connector 119 at the output terminal, as shown in FIGURE 9, also is formed of sheet metal and has a leg 131 carrying a socket 132 soldered to the end of the center conductor of coaxial line element 22, an intermediate portion 133 of substantial width carrying two lugs 134 adapted to clamp and hold the end of conductor 79 of the filter, and another leg portion 135 which extends parallel to the first leg portion and also outwardly away from the intermediate portion to a point where its opening 136 can engage the center connector 118 of the output terminal fitting 115. This connector also has sufficient width and size to transmit the high frequency currents involved and a sufficient surface area to permit sufficient heat radiation to maintain the connector and the parts to which it is connected relatively cool. Connectors 116 and 119 are preferably formed of sheet brass that is silver plated to reduce undesired skin effects and losses. Preferably the minimum width of each connector 116 and 119 transversely to the direction of current flow is at least ten times its thickness, for efficient current transmission and heat radiation.

In manufacture of either of the filter of FIGURES 1–3, the housing 6 is made independently of the remainder of the apparatus. Preferably, a cradle subassembly is manufactured by inserting the outer metallic tubes of the coaxial line elements into the partitions 45, 46 and 47 in the desired relation, and soldering them in place. The capacitors are then installed at the opening 51 in each partition, by merely installing the dielectric members 52 and 53 on opposite sides of each partition, installing the plate members in the recesses 55 of the dielectric members, and screwing the plate members together. Before or after the capacitors are installed, the internal portions of the coaxial line elements are installed in the tubes. The connectors 39 are soldered to the center conductors of line elements 21 and 22. The various conductors 71, 77, 78 and 79 are installed by mechanically clamping them in place on the center conductor connectors of the coaxial line elements 23, 25, 24 and 26 and the capacitor elements 27, 28 and 29. Preferably these clamped junctures are also soldered to provide added mechanical strength, promote electrical connection, and insure against any possibilities of corrosion at the juncture.

The subassembly is then inserted into the housing and soldered in place by means of the lugs 48 on partitions 45, 46 and 47.

The connectors 39 are also soldered to the center conductors 97 of the input and output terminal fitting 14 and 151, after which the lid 12 can be installed. The filter of FIGURE 7 can be similarly assembled.

In addition to the parts mentioned above as being silver clad, it is preferable that the housing 6, partitions 45–47, outer tubes of the coaxial line elements, capacitor plate members 59 and 66, the metal parts of the terminal fitting members 14 and 15, and other suitable metal parts be silver clad, as by plating, to reduce undesired skin effects and $I^2R$ losses.

The partitions 45, 46 and 47, as previously indicated, locate and support the outer tubes of the coaxial line elements, and locate and support the capacitors, while each acts as one plate of one of the capacitors. The end partition elements 45 and 47 engage and make good electrical connection with the tubes 37 and 41 of the coaxial line elements essentially at their open and closed ends, as shown, since this markedly increases attenuation and provides a shorter path for travel of heat from the ends of the line elements through the partition to the housing walls. The partitions are substantially thick for improved electrical conductivity and heat dissipation. Furthermore, the partitions in combination with the capacitors disposed across the openings in the partitions isolate and shield sections of the filter from each other. Thus, the input ends of three coaxial line elements 21, 23 and 25 and two coils 31 and 33 as well as the connection 39 to the input terminal fitting 14 are located in a shielded and isolated compartment at one end of the housing 6. The input ends of the other three coaxial line elements 22, 24 and 26 and two associated coils 32 and 36 as well as the connection to the output terminal fitting 15 are located in the other end compartment. The coils 31 and 33 in one end compartment are essentially perpendicular to each other, as are the coils 32 and 36 in the other end compartment, to reduce magnetic interaction between the coils. The straight portions 71*a* and 79*a* of conductors 71 and 79 in the end compartments also tend to act as inductors, shown as 71*a'* and 79*a'* in FIGURE 11, at high frequencies. The intermediate series coils 34 and 35 are each located in its own compartment, isolated from all other coils. These features all cooperate to reduce very substantially or eliminate completely coupling, leakage, cross talk and other undesired reactions between the components of the filter.

Moreover, the relatively large diameters of the conductors and capacitors permit satisfactory handling of high power currents and adequate heat dissipation, while the clamping of the ends of the conductors to the capacitors and to the coaxial line elements insures firm mechanical and electrical connections, without reliance on solder, although solder may be used at these points. This is important in insuring adequate electrical contact even if the solder should soften or melt due to excessive heating at the connections, as could occur due to temporary overloads. The large area thin-walled connectors 39 in the first embodiment, and 116 and 119 in the second embodiment, between the end terminal coaxial line elements and the center conductors of the input and output terminal fittings also provide for adequate power transmission and heat radiation and prevent the adjacent portions of elements to which they are connected from becoming overheated enough to impair the soldered connections. Moreover, the legs of each of these connectors, which as shown are preferably planar, are parallel to the walls of the housing 6 to decrease the effects of the coaxial line discontinuity by decreasing series inductance and increasing shunt capacitance effects produced by the connectors. The connector members 73 on the quarter wave length coaxial elements prevent any adverse effects at the locations which otherwise would be the hottest in the filter; because of their large size each provides a considerable heat radiating area which tends to prevent overheating; and the clamping of the conductors provides good electrical contact by mechanical means without reliance on the solder. The conductors may be solid rather than tubular; this may be desirable at higher powers.

All of these factors, as well as others not described, make possible substantial reduction or elimination of undesired intereffects between different components of the filter, lower pass band insertion loss, lower voltage standing wave ratio, and higher stop or reject attenuation, thus resulting in high performance efficiency. Moreover, these advantages are made possible in a filter unit that handles high powers without overheating and is physically exceptionally compact and light, being much shorter than prior filter units designed to operate at the same power. For example, the illustrated unit, only six inches long, replaces a conventional tubular filter unit four feet long.

It will be appreciated that the invention may be embodied in forms other than those specifically disclosed herein, which are given by way of example only. The essential combination, features and characteristics of the invention are set forth in the appended claims.

I claim:

1. A filter comprising, connected in sequence, an input terminal fitting adapted to be connected to a coaxial transmission line, a first elongated coaxial line element having a central conductor by means of which the input end of said coaxial line element is connected, a second elongated coaxial line element having a central conductor by means of which the input end of said coaxial line element is connected, a first coil, a third elongated coaxial line element having a central conductor by means of which the input end of said element is connected, at least four inductance coils, three spaced capacitors each pair of which has one of said four coils therebetween, a fourth elongated coaxial line element having a central conductor by means of which the input end of said element is connected, a sixth elongated coaxial line element having a central conductor by means of which the input end of said element is connected, and an output terminal fitting adapted to be connected to a coaxial transmission line; a metallic housing in which said first, second and third coaxial line element are longitudinally disposed with their connected ends facing said input member and in which said fourth, fifth and sixth coaxial line elements are longitudinally disposed with their connected ends facing said output member; and three spaced partition elements extending across said housing, each supporting one of said capacitor elements with its connection portions extending on opposite sides of said partition, said partition elements serving to divide said chamber into four shielded compartments, of which each end compartment contains one of said terminal fittings, the connected input ends of three of said coaxial line elements, one of said first and last coils and one of said four coils connected to one of said capacitors, and of which the two compartments between said end compartments each contains one of said four coils connected to two of said capacitors.

2. The filter of claim 1 in which each of said end compartments includes a conductor that includes two coils and is connected to the terminal fitting in said compartment, to the central conductors at the input ends of three of said coaxial line elements, and to one of the connection portions of one of said capacitors, and means mechanically clamping said conductor to the central conductors of said three coaxial line elements and to said connection portion of said capacitor; and in which filter each of said intermediate compartments includes a conductor, comprising one of said four coils, connected to the connection portions of the two capacitors carried by the partitions defining said compartment, and means mechanically clamping said conductor to said connection portions.

3. The filter of claim 1 in which the partition carrying a capacitor is apertured, and the capacitor carried by said partition comprises two dielectric members formed of solid dielectric material mounted on opposite sides of the partition, said dielectric members engaging each other through said partition to locate said members relatively to each other and to said partition, a metallic plate member bearing against the side of each dielectric member facing away from the other dielectric member, and means urging said plate members toward each other to hold them against said dielectric members and clamp said dielectric members against said partition.

4. The filter of claim 2 in which the partition carrying a capacitor is apertured, and the capacitor carried by said partition comprises two dielectric members formed of solid dielectric material mounted on opposite sides of the partition, said dielectric members engaging each other through said partition to locate said members relatively to each other and to said partition, a metallic plate member bearing against the side of each dielectric member facing away from the other dielectric member, and means urging said plate members toward each other to hold them against said dielectric member and clamp said dielectric members against said partition.

5. The filter of claim 2 in which said conductors in said end compartments are connected to said transmission line terminal members by connector members of thin cross section and substantial width great enough to transmit high power currents and provide substantial heat radiating areas.

6. A filter comprising a metallic housing; a coaxial transmission line terminal member at opposite ends of said housing; a first set of elongated coaxial line elements longitudinally disposed in said housing with their input ends facing toward one end of said housing; a second set of elongated coaxial line elements longitudinally disposed in said housing with their input ends extending toward the other end of said housing; at least two spaced metallic partition elements extending across said housing into contact with the walls of said coaxial line elements and said housing along the entire edge of said partition elements to divide said chamber into electrically isolated end compartments each containing one of the terminal members and the input ends of one of the sets of coaxial line elements, and into at least one electrically isolated intermediate compartment; a capacitor element on each of said partition elements; an uncoiled inductance in each of said end compartments connecting the input ends of two of said coaxial line elements; means for mechanically clamping said inductance to the input ends of said coaxial line elements and to said capacitor; a coil in said intermediate compartment connecting the capacitors on adjacent partitions; and means mechanically clamping said coil to said capacitors.

7. The filter of claim 6 in which the partition carrying a capacitor is apertured, and the capacitor carried by said partition comprises two dielectric members formed of solid dielectric material mounted on opposite sides of the partition, said dielectric members engaging each other through said partition to locate said members relatively to each other and to said partition, a metallic plate member bearing against the side of each dielectric member facing away from the other dielectric member, and means urging said plate members toward each other to hold them against said dielectric members and clamp said dielectric members against said partition.

8. The filter of claim 6 in which said conductors in said end compartments are connected to said transmission line terminal members by connector members of thin cross section and width at least ten times said thin cross section to transmit high power currents and provide substantial heat radiating area.

References Cited by the Examiner

UNITED STATES PATENTS

| | | | |
|---|---|---|---|
| 2,163,775 | 6/1939 | Conklin | 333—79 |
| 2,844,801 | 7/1958 | Sabaroff | 333—73 |
| 2,939,905 | 6/1960 | Canfield | 339—276 |
| 2,952,805 | 9/1960 | Dornfeld | 317—261 |
| 2,970,288 | 1/1961 | Hubbell | 339—174 |
| 3,002,136 | 9/1961 | Garstang | 317—242 |
| 3,058,077 | 10/1962 | Cornell | 339—122 |
| 3,065,434 | 11/1962 | Calderhead | 333—70 |
| 3,129,396 | 4/1964 | Germain | 333—79 |
| 3,175,136 | 3/1965 | Mison | 317—251 |

HERMAN KARL SAALBACH, *Primary Examiner.*

C. BARAFF, *Assistant Examiner.*